US008692867B2

(12) United States Patent
Bigioi et al.

(10) Patent No.: US 8,692,867 B2
(45) Date of Patent: Apr. 8, 2014

(54) OBJECT DETECTION AND RENDERING FOR WIDE FIELD OF VIEW (WFOV) IMAGE ACQUISITION SYSTEMS

(75) Inventors: Petronel Bigioi, Galway (IE); Alexandru Drimbarean, Galway (IE); Mihnea Gangea, Bucharest (RO); Piotr Stec, Galway (IE); Peter Corcoran, Claregalway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 441 days.

(21) Appl. No.: 12/959,151

(22) Filed: Dec. 2, 2010

(65) Prior Publication Data

US 2011/0216158 A1    Sep. 8, 2011

Related U.S. Application Data

(60) Provisional application No. 61/311,264, filed on Mar. 5, 2010.

(51) Int. Cl.
| | |
|---|---|
| *G02B 21/18* | (2006.01) |
| *H04N 7/00* | (2011.01) |
| *G02B 21/22* | (2006.01) |

(52) U.S. Cl.
CPC ..................................... *G02B 21/22* (2013.01)
USPC ............. 348/36; 359/362; 359/372; 359/373; 359/377

(58) Field of Classification Search
None
See application file for complete search history.

(56) References Cited

U.S. PATENT DOCUMENTS

| | | | | |
|---|---|---|---|---|
| 1,906,509 | A | * | 5/1933 | Aschenbrenner ............... 355/46 |
| 3,251,283 | A | * | 5/1966 | Wood ............................... 396/10 |
| 3,356,002 | A | * | 12/1967 | Raitiere ......................... 396/322 |
| 4,555,168 | A | * | 11/1985 | Meier et al. ....................... 353/7 |
| 5,508,734 | A | | 4/1996 | Baker et al. |
| 5,724,456 | A | | 3/1998 | Boyack et al. |
| 5,818,975 | A | | 10/1998 | Goodwin et al. |

(Continued)

FOREIGN PATENT DOCUMENTS

| | | | |
|---|---|---|---|
| JP | 11298780 A | * | 10/1999 |
| WO | 2011/107448 A2 | | 9/2011 |
| WO | 2011/107448 A3 | | 11/2011 |

OTHER PUBLICATIONS

PCT Invitation to Pay Additional Fees and, Where Applicable, Protest Fee, for PCT Application No. PCT/EP2011/052970, dated Jul. 14, 2011, 5 pages.

(Continued)

*Primary Examiner* — Sath V Perungavoor
*Assistant Examiner* — Matthew J Anderson
(74) *Attorney, Agent, or Firm* — Hickman Palermo Truong Becker Bingham Wong LLP

(57) ABSTRACT

An image acquisition device having a wide field of view includes a lens and image sensor configured to capture an original wide field of view (WFoV) image with a field of view of more than 90°. The device has an object detection engine that includes one or more cascades of object classifiers, e.g., face classifiers. A WFoV correction engine may apply rectilinear and/or cylindrical projections to pixels of the WFoV image, and/or non-linear, rectilinear and/or cylindrical lens elements or lens portions serve to prevent and/or correct distortion within the original WFoV image. One or more objects located within the original and/or distortion-corrected WFoV image is/are detectable by the object detection engine upon application of the one or more cascades of object classifiers.

10 Claims, 7 Drawing Sheets

(56) References Cited

U.S. PATENT DOCUMENTS

| | | |
|---|---|---|
| 5,978,519 A | 11/1999 | Bollman et al. |
| 5,991,456 A | 11/1999 | Rahman et al. |
| 6,035,072 A | 3/2000 | Read |
| 6,044,181 A * | 3/2000 | Szeliski et al. ............... 382/284 |
| 6,097,470 A | 8/2000 | Buhr et al. |
| 6,101,271 A | 8/2000 | Yamashita et al. |
| 6,192,149 B1 | 2/2001 | Eschbach et al. |
| 6,222,683 B1 * | 4/2001 | Hoogland et al. ............ 359/725 |
| 6,249,315 B1 | 6/2001 | Holm |
| 6,268,939 B1 | 7/2001 | Klassen et al. |
| 6,282,317 B1 | 8/2001 | Luo et al. |
| 6,393,148 B1 | 5/2002 | Bhaskar |
| 6,407,777 B1 | 6/2002 | DeLuca |
| 6,421,468 B1 | 7/2002 | Ratnakar et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,466,254 B1 * | 10/2002 | Furlan et al. .................... 348/36 |
| 6,473,199 B1 | 10/2002 | Gilman et al. |
| 6,504,951 B1 | 1/2003 | Luo et al. |
| 7,042,505 B1 | 5/2006 | DeLuca |
| 7,058,237 B2 * | 6/2006 | Liu et al. ....................... 382/276 |
| 7,206,461 B2 | 4/2007 | Steinberg et al. |
| 7,269,292 B2 | 9/2007 | Steinberg |
| 7,280,289 B2 * | 10/2007 | Yamakawa .................... 359/771 |
| 7,295,233 B2 | 11/2007 | Steinberg et al. |
| 7,308,156 B2 | 12/2007 | Steinberg et al. |
| 7,310,450 B2 | 12/2007 | Steinberg et al. |
| 7,315,630 B2 | 1/2008 | Steinberg et al. |
| 7,315,631 B1 | 1/2008 | Corcoran et al. |
| 7,315,658 B2 | 1/2008 | Steinberg et al. |
| 7,317,815 B2 | 1/2008 | Steinberg et al. |
| 7,327,899 B2 * | 2/2008 | Liu et al. ....................... 382/276 |
| 7,336,821 B2 | 2/2008 | Ciuc et al. |
| 7,340,109 B2 | 3/2008 | Steinberg et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,424,170 B2 | 9/2008 | Steinberg et al. |
| 7,436,998 B2 | 10/2008 | Steinberg et al. |
| 7,440,593 B1 | 10/2008 | Steinberg et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,469,071 B2 | 12/2008 | Drimbarean et al. |
| 7,471,846 B2 | 12/2008 | Steinberg et al. |
| 7,474,341 B2 | 1/2009 | DeLuca et al. |
| 7,495,845 B2 * | 2/2009 | Asami ............................ 359/753 |
| 7,506,057 B2 | 3/2009 | Bigioi et al. |
| 7,515,740 B2 | 4/2009 | Corcoran et al. |
| 7,536,036 B2 | 5/2009 | Steinberg et al. |
| 7,536,060 B2 | 5/2009 | Steinberg et al. |
| 7,536,061 B2 | 5/2009 | Steinberg et al. |
| 7,545,995 B2 | 6/2009 | Steinberg et al. |
| 7,551,754 B2 | 6/2009 | Steinberg et al. |
| 7,551,755 B1 | 6/2009 | Steinberg et al. |
| 7,551,800 B2 | 6/2009 | Corcoran et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,565,030 B2 | 7/2009 | Steinberg et al. |
| 7,574,016 B2 | 8/2009 | Steinberg et al. |
| 7,587,068 B1 | 9/2009 | Steinberg et al. |
| 7,587,085 B2 | 9/2009 | Steinberg et al. |
| 7,590,305 B2 | 9/2009 | Steinberg et al. |
| 7,599,577 B2 | 10/2009 | Ciuc et al. |
| 7,606,417 B2 | 10/2009 | Steinberg et al. |
| 7,612,946 B2 * | 11/2009 | Kweon et al. .................. 359/648 |
| 7,616,233 B2 | 11/2009 | Steinberg et al. |
| 7,619,665 B1 | 11/2009 | DeLuca |
| 7,620,218 B2 | 11/2009 | Steinberg et al. |
| 7,630,006 B2 | 12/2009 | DeLuca et al. |
| 7,630,527 B2 | 12/2009 | Steinberg et al. |
| 7,634,109 B2 | 12/2009 | Steinberg et al. |
| 7,636,486 B2 | 12/2009 | Steinberg et al. |
| 7,639,888 B2 | 12/2009 | Steinberg et al. |
| 7,639,889 B2 | 12/2009 | Steinberg et al. |
| 7,660,478 B2 | 2/2010 | Steinberg et al. |
| 7,676,108 B2 | 3/2010 | Steinberg et al. |
| 7,676,110 B2 | 3/2010 | Steinberg et al. |
| 7,680,342 B2 | 3/2010 | Steinberg et al. |
| 7,683,946 B2 | 3/2010 | Steinberg et al. |
| 7,684,630 B2 | 3/2010 | Steinberg |
| 7,685,341 B2 | 3/2010 | Steinberg et al. |
| 7,689,009 B2 | 3/2010 | Corcoran et al. |
| 7,692,696 B2 | 4/2010 | Steinberg et al. |
| 7,693,311 B2 | 4/2010 | Steinberg et al. |
| 7,694,048 B2 | 4/2010 | Steinberg et al. |
| 7,697,778 B2 | 4/2010 | Steinberg et al. |
| 7,702,136 B2 | 4/2010 | Steinberg et al. |
| 7,702,236 B2 | 4/2010 | Steinberg et al. |
| 7,715,597 B2 | 5/2010 | Costache et al. |
| 7,738,015 B2 | 6/2010 | Steinberg et al. |
| 7,746,385 B2 | 6/2010 | Steinberg et al. |
| 7,747,596 B2 | 6/2010 | Bigioi et al. |
| 7,773,118 B2 | 8/2010 | Florea et al. |
| 7,787,022 B2 | 8/2010 | Steinberg et al. |
| 7,792,335 B2 | 9/2010 | Steinberg et al. |
| 7,792,970 B2 | 9/2010 | Bigioi et al. |
| 7,796,816 B2 | 9/2010 | Steinberg et al. |
| 7,796,822 B2 | 9/2010 | Steinberg et al. |
| 7,804,531 B2 | 9/2010 | DeLuca et al. |
| 7,804,983 B2 | 9/2010 | Steinberg et al. |
| 7,809,162 B2 | 10/2010 | Steinberg et al. |
| 7,822,234 B2 | 10/2010 | Steinberg et al. |
| 7,822,235 B2 | 10/2010 | Steinberg et al. |
| 7,835,071 B2 * | 11/2010 | Izumi ............................ 359/356 |
| 7,843,652 B2 * | 11/2010 | Asami et al. .................. 359/753 |
| 7,844,076 B2 | 11/2010 | Corcoran et al. |
| 7,844,135 B2 | 11/2010 | Steinberg et al. |
| 7,847,839 B2 | 12/2010 | DeLuca et al. |
| 7,847,840 B2 | 12/2010 | DeLuca et al. |
| 7,848,549 B2 | 12/2010 | Steinberg et al. |
| 7,852,384 B2 | 12/2010 | DeLuca et al. |
| 7,853,043 B2 | 12/2010 | Steinberg et al. |
| 7,855,737 B2 | 12/2010 | Petrescu et al. |
| 7,860,274 B2 | 12/2010 | Steinberg et al. |
| 7,864,990 B2 | 1/2011 | Corcoran et al. |
| 7,865,036 B2 | 1/2011 | Ciuc et al. |
| 7,868,922 B2 | 1/2011 | Ciuc et al. |
| 7,869,628 B2 | 1/2011 | Corcoran et al. |
| 7,929,221 B2 * | 4/2011 | Ning ............................. 359/753 |
| 8,094,183 B2 * | 1/2012 | Toyoda et al. ................... 348/36 |
| 8,134,479 B2 * | 3/2012 | Suhr et al. ................... 340/932.2 |
| 8,144,033 B2 * | 3/2012 | Chinomi et al. .............. 340/937 |
| 8,264,524 B1 * | 9/2012 | Davey ............................. 348/36 |
| 8,340,453 B1 * | 12/2012 | Chen et al. .................... 382/254 |
| 2001/0031142 A1 | 10/2001 | Whiteside |
| 2002/0105662 A1 | 8/2002 | Patton et al. |
| 2002/0114535 A1 | 8/2002 | Luo |
| 2002/0145671 A1 | 10/2002 | Alon et al. |
| 2003/0052991 A1 | 3/2003 | Stavely et al. |
| 2004/0061787 A1 | 4/2004 | Liu et al. |
| 2005/0031224 A1 | 2/2005 | Prilutsky et al. |
| 2005/0107741 A1 | 5/2005 | Willard et al. |
| 2005/0140801 A1 | 6/2005 | Prilutsky et al. |
| 2005/0169529 A1 | 8/2005 | Owechko et al. |
| 2005/0196068 A1 | 9/2005 | Kawai |
| 2006/0093238 A1 | 5/2006 | Steinberg et al. |
| 2006/0182437 A1 | 8/2006 | Williams et al. |
| 2006/0204034 A1 | 9/2006 | Steinberg et al. |
| 2006/0256226 A1 | 11/2006 | Alon et al. |
| 2006/0268130 A1 | 11/2006 | Williams et al. |
| 2007/0045991 A1 | 3/2007 | Perk |
| 2007/0147820 A1 | 6/2007 | Steinberg et al. |
| 2007/0160307 A1 | 7/2007 | Steinberg et al. |
| 2007/0236573 A1 | 10/2007 | Alon et al. |
| 2007/0236574 A1 | 10/2007 | Alon et al. |
| 2007/0239417 A1 | 10/2007 | Alon et al. |
| 2007/0253638 A1 | 11/2007 | Steinberg et al. |
| 2007/0269108 A1 | 11/2007 | Steinberg et al. |
| 2007/0296833 A1 | 12/2007 | Corcoran et al. |

(56) References Cited

U.S. PATENT DOCUMENTS

| | | |
|---|---|---|
| 2008/0002185 A1 | 1/2008 | Gitelson et al. |
| 2008/0008041 A1 | 1/2008 | Pettersen et al. |
| 2008/0009562 A1 | 1/2008 | Mitachi et al. |
| 2008/0013798 A1 | 1/2008 | Ionita et al. |
| 2008/0013799 A1 | 1/2008 | Steinberg et al. |
| 2008/0021989 A1 | 1/2008 | Carraher et al. |
| 2008/0028183 A1 | 1/2008 | Hwu et al. |
| 2008/0038325 A1 | 2/2008 | Nho et al. |
| 2008/0043121 A1 | 2/2008 | Prilutsky et al. |
| 2008/0045728 A1 | 2/2008 | Kruper et al. |
| 2008/0049970 A1 | 2/2008 | Ciuc et al. |
| 2008/0075385 A1 | 3/2008 | David et al. |
| 2008/0075515 A1 | 3/2008 | Large |
| 2008/0095466 A1 | 4/2008 | Kinrot et al. |
| 2008/0112599 A1 | 5/2008 | Nanu et al. |
| 2008/0143854 A1 | 6/2008 | Steinberg et al. |
| 2008/0175436 A1 | 7/2008 | Asari et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1 | 9/2008 | Blonk et al. |
| 2008/0219518 A1 | 9/2008 | Steinberg et al. |
| 2008/0219581 A1 | 9/2008 | Albu et al. |
| 2008/0220750 A1 | 9/2008 | Steinberg et al. |
| 2008/0232711 A1 | 9/2008 | Prilutsky et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Bigioi |
| 2008/0309769 A1 | 12/2008 | Albu et al. |
| 2008/0309770 A1 | 12/2008 | Florea et al. |
| 2008/0316317 A1 | 12/2008 | Weissman et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003661 A1 | 1/2009 | Ionita et al. |
| 2009/0003708 A1 | 1/2009 | Steinberg et al. |
| 2009/0021576 A1 | 1/2009 | Linder et al. |
| 2009/0022422 A1 | 1/2009 | Sorek et al. |
| 2009/0040342 A1 | 2/2009 | Drimbarean et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0115915 A1 | 5/2009 | Steinberg et al. |
| 2009/0123063 A1 | 5/2009 | Ciuc |
| 2009/0128666 A1 | 5/2009 | Rappaport et al. |
| 2009/0141163 A1 | 6/2009 | Attar et al. |
| 2009/0147111 A1 | 6/2009 | Litvinov et al. |
| 2009/0167893 A1 | 7/2009 | Susanu et al. |
| 2009/0179998 A1 | 7/2009 | Steinberg et al. |
| 2009/0179999 A1 | 7/2009 | Albu et al. |
| 2009/0185753 A1 | 7/2009 | Albu et al. |
| 2009/0189997 A1 | 7/2009 | Stec et al. |
| 2009/0189998 A1 | 7/2009 | Nanu et al. |
| 2009/0190238 A1 | 7/2009 | Alon et al. |
| 2009/0190803 A1 | 7/2009 | Neghina et al. |
| 2009/0196466 A1 | 8/2009 | Capata et al. |
| 2009/0238410 A1 | 9/2009 | Corcoran et al. |
| 2009/0238419 A1 | 9/2009 | Steinberg et al. |
| 2009/0263022 A1 | 10/2009 | Petrescu et al. |
| 2009/0303342 A1 | 12/2009 | Cocoran et al. |
| 2009/0303343 A1 | 12/2009 | Drimbarean et al. |
| 2009/0304278 A1 | 12/2009 | Steinberg et al. |
| 2010/0002071 A1* | 1/2010 | Ahiska ........................... 348/36 |
| 2010/0014721 A1 | 1/2010 | Steinberg et al. |
| 2010/0026831 A1 | 2/2010 | Ciuc et al. |
| 2010/0026832 A1 | 2/2010 | Ciuc et al. |
| 2010/0026833 A1 | 2/2010 | Ciuc et al. |
| 2010/0033551 A1* | 2/2010 | Agarwala et al. ........... 348/36 |
| 2010/0039520 A1 | 2/2010 | Nanu et al. |
| 2010/0039525 A1 | 2/2010 | Steinberg et al. |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054533 A1 | 3/2010 | Steinberg et al. |
| 2010/0054549 A1 | 3/2010 | Steinberg et al. |
| 2010/0054592 A1 | 3/2010 | Nanu et al. |
| 2010/0060727 A1 | 3/2010 | Steinberg et al. |
| 2010/0066822 A1 | 3/2010 | Steinberg et al. |
| 2010/0141786 A1 | 6/2010 | Bigioi et al. |
| 2010/0141787 A1 | 6/2010 | Bigioi et al. |
| 2010/0141798 A1 | 6/2010 | Steinberg et al. |
| 2010/0146165 A1 | 6/2010 | Steinberg et al. |
| 2010/0165140 A1 | 7/2010 | Steinberg |
| 2010/0165150 A1 | 7/2010 | Steinberg et al. |
| 2010/0182458 A1 | 7/2010 | Steinberg et al. |
| 2010/0194895 A1 | 8/2010 | Steinberg |
| 2010/0201826 A1 | 8/2010 | Steinberg et al. |
| 2010/0201827 A1 | 8/2010 | Steinberg et al. |
| 2010/0202707 A1 | 8/2010 | Costache et al. |
| 2010/0220899 A1 | 9/2010 | Steinberg et al. |
| 2010/0231727 A1 | 9/2010 | Steinberg et al. |
| 2010/0238309 A1 | 9/2010 | Florea et al. |
| 2010/0259622 A1 | 10/2010 | Steinberg et al. |
| 2010/0260414 A1 | 10/2010 | Ciuc |
| 2010/0271499 A1 | 10/2010 | Steinberg et al. |
| 2010/0272363 A1 | 10/2010 | Steinberg et al. |
| 2010/0295959 A1 | 11/2010 | Steinberg et al. |
| 2010/0321537 A1 | 12/2010 | Zamfir |
| 2010/0328472 A1 | 12/2010 | Steinberg et al. |
| 2010/0328486 A1 | 12/2010 | Steinberg et al. |
| 2010/0329549 A1 | 12/2010 | Steinberg et al. |
| 2010/0329582 A1 | 12/2010 | Albu et al. |
| 2011/0002506 A1 | 1/2011 | Ciuc et al. |
| 2011/0002545 A1 | 1/2011 | Steinberg et al. |
| 2011/0007174 A1 | 1/2011 | Bacivarov et al. |
| 2011/0013043 A1 | 1/2011 | Corcoran et al. |
| 2011/0013044 A1 | 1/2011 | Steinberg et al. |
| 2011/0025859 A1 | 2/2011 | Steinberg et al. |
| 2011/0025886 A1 | 2/2011 | Steinberg et al. |
| 2011/0026780 A1 | 2/2011 | Corcoran et al. |
| 2011/0033112 A1 | 2/2011 | Steinberg et al. |
| 2011/0043648 A1 | 2/2011 | Albu et al. |
| 2011/0050919 A1 | 3/2011 | Albu et al. |
| 2011/0050938 A1 | 3/2011 | Capata |
| 2011/0053654 A1 | 3/2011 | Petrescu et al. |
| 2011/0055354 A1 | 3/2011 | Bigioi et al. |
| 2011/0063465 A1 | 3/2011 | Nanu et al. |
| 2011/0081052 A1 | 4/2011 | Bigioi et al. |
| 2011/0216156 A1 | 9/2011 | Bigioi et al. |
| 2011/0216157 A1 | 9/2011 | Bigioi et al. |

OTHER PUBLICATIONS

PCT Notification of Transmittal of the International Search Report and the Written Opinion of the International Searching Authority, or the Declaration, for PCT Application No. PCT/EP2011/052970, dated Sep. 27, 2011, 19 pages.

tawbaware.com: PTAssembler Projections, Projections, Jun. 12, 2009, pp. 1-15, XP002641900, Retrieved from the Internet:URL:http://web.archive.org/web/20090612020605/http:/v/projections.htm, [retrieved on Jun. 14, 2011].

Co-pending U.S. Appl. No. 12/572,930, filed Oct. 2, 2009.
Co-pending U.S. Appl. No. 12/636,608, filed Dec. 11, 2009.
Co-pending U.S. Appl. No. 12/636,618, filed Dec, 11, 2009.
Co-pending U.S. Appl. No. 12/636,629, filed Dec. 11, 2009.
Co-pending U.S. Appl. No. 12/636,639, filed Dec. 11, 2009.
Co-pending U.S. Appl. No. 12/636,647, filed Dec. 11, 2009.
Co-pending U.S. Appl. No. 12/825,280, filed Jun. 28, 2010.
Co-pending U.S. Appl. No. 12/941,995, filed Nov. 8, 2010.
Co-pending U.S. Appl. No. 12/959,281, filed Dec. 2, 2010.
Co-pending U.S. Appl. No. 12/907,921, filed Oct. 19, 2010.

* cited by examiner

Figure 1A: Piazza Navona, Roma by Gaspar Van Wittel, 1652-1736
(Museo Thyssen-Bornemisza, Madrid).
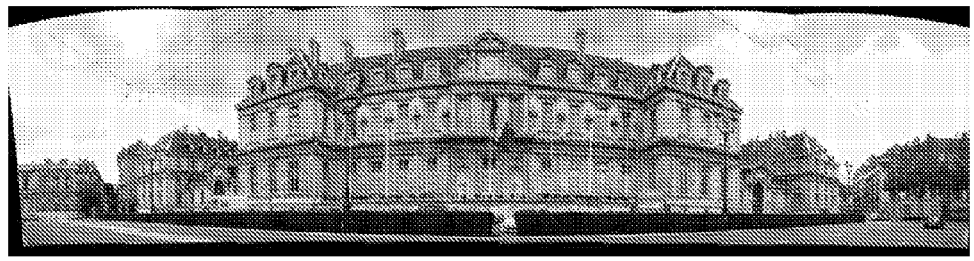
Figure 1B
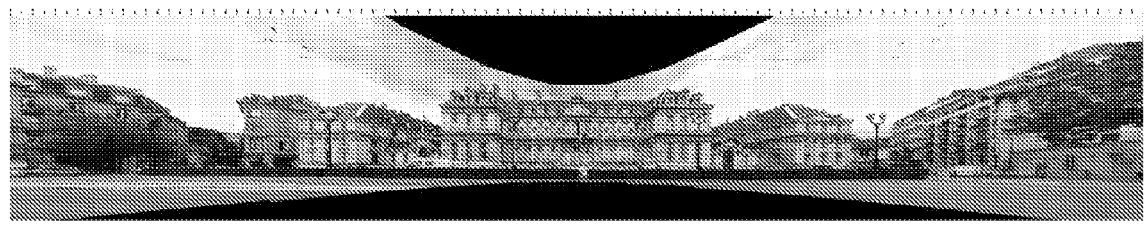
Figure 1C

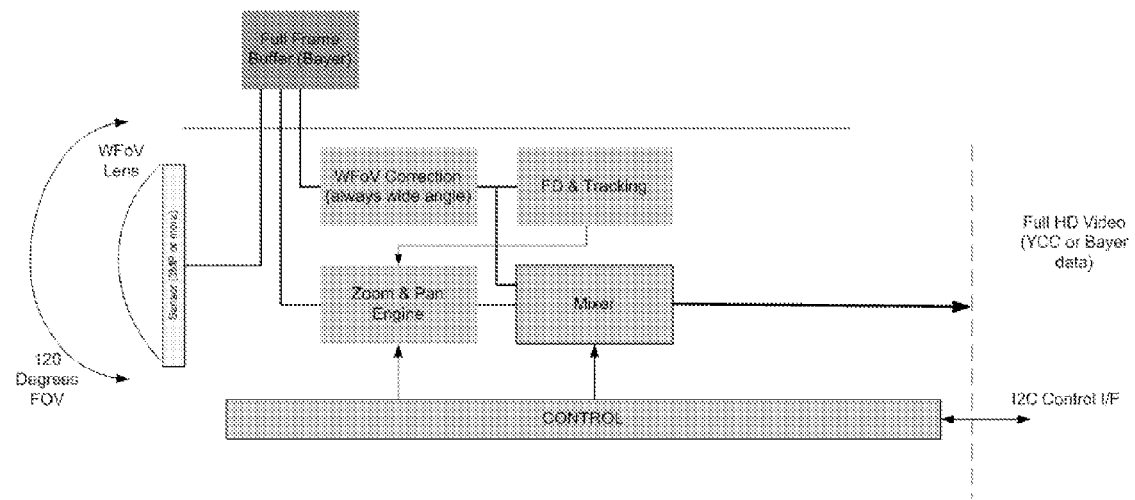
Figure 2: WFOV system incorporating face-tracker

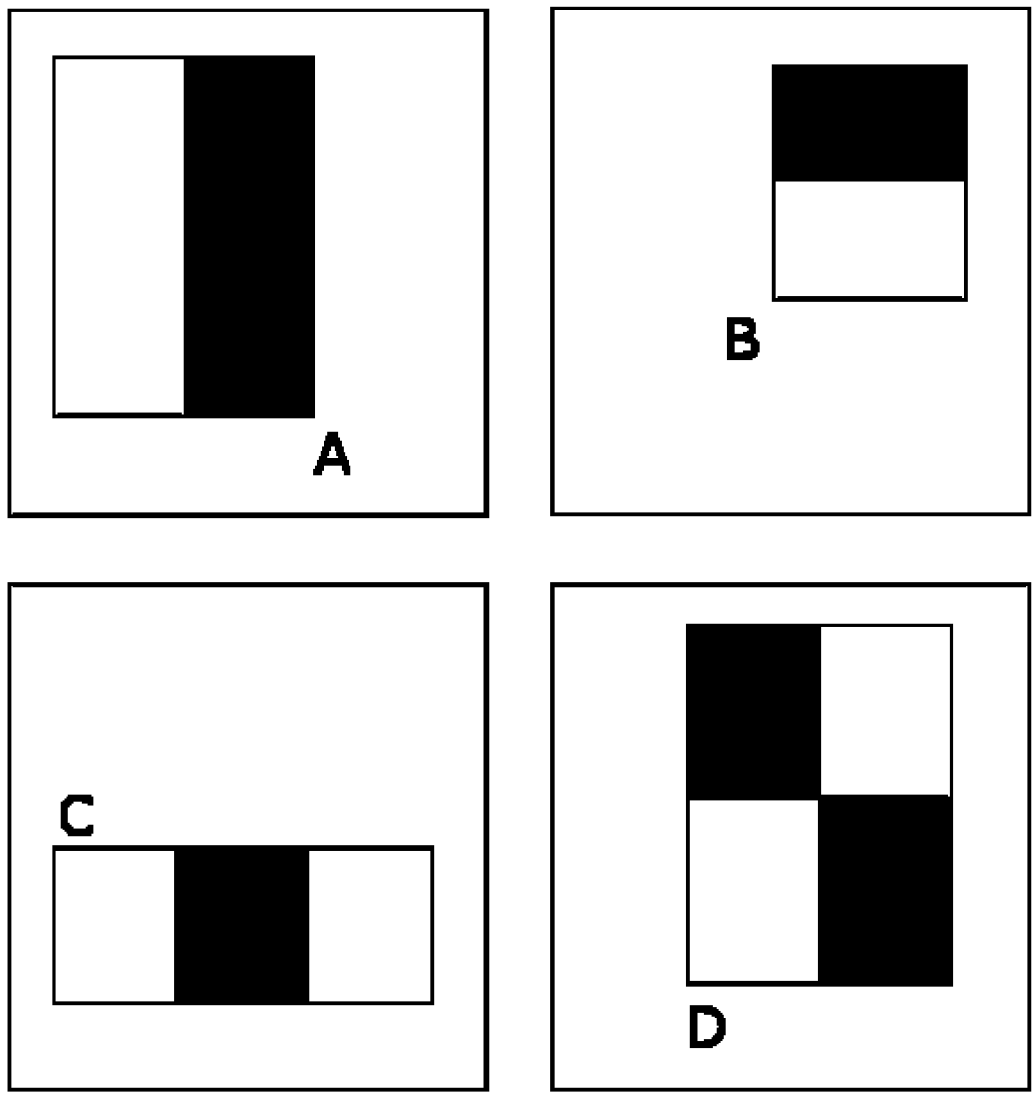
Figure 4: First four Haar classifiers

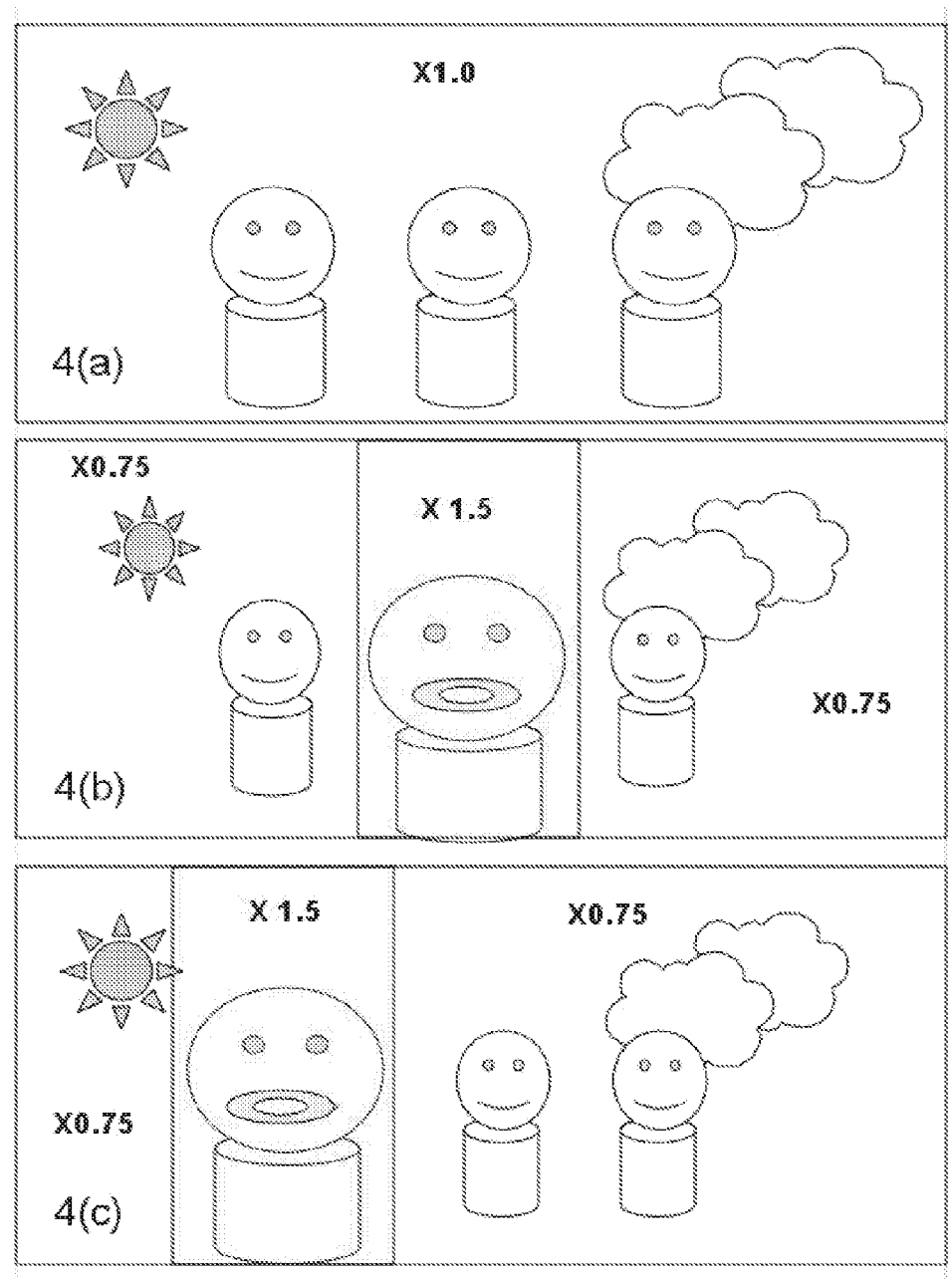
Figure 4(A)-(C)

Figures 5(A)-(C)
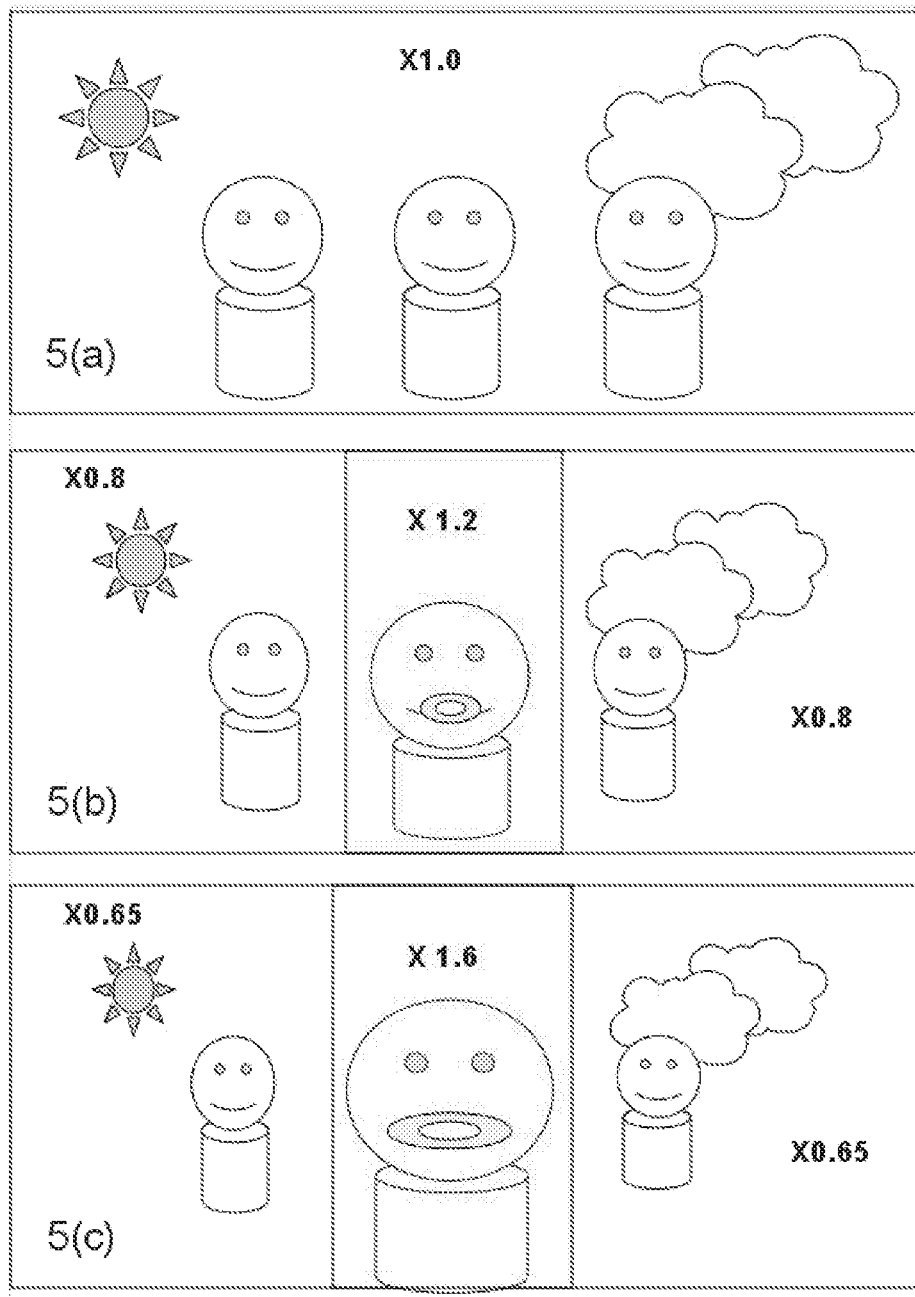

OBJECT DETECTION AND RENDERING FOR WIDE FIELD OF VIEW (WFOV) IMAGE ACQUISITION SYSTEMS

PRIORITY

This application claims the benefit of priority under 35 USC §119 to U.S. provisional patent application No. 61/311,264, filed Mar. 5, 2010. This application is one of a series of contemporaneously-filed patent applications including U.S. patent applications Ser. Nos. 12/959,089; 12/959,137; and 12/959,151, each of which are incorporated by reference.

BACKGROUND

Face detection methods have become very well established within digital cameras in recent years. This technology brings a range of benefits including enhanced acquisition of the main image and adaptation of the acquisition process to optimized image appearance and quality based on the detected faces.

More recently, newer consumer cameras have begun to feature wide field of view (WFOV) imaging systems and as the benefits of obtaining a wider scene become apparent to consumers, it is expected that further growth will ensue in such imaging systems along with an ability to achieve even wider fields of view over time. In professional cameras, such WFOV imaging systems are better known, the most well known being the fish-eye lens. WFOV imaging systems are also used in a range of applications including Google's "street-view" technology and for some video-phone systems where they enable a number of people sitting at a table to be imaged by a single sensor and optical system.

Now mapping a WFOV image onto a rectilinear image sensor is non-trivial and a wide range of different techniques are available depending on the exact form of the WFOV lens and associated optical elements. The desired image perspective is also important.

Unfortunately due to the complexity of WFOV imaging systems the benefits of face detection technologies have not been successfully applied to such systems. In particular, faces near the center of a WFOV camera appear closer to the camera and experience some geometrical distortions. Faces about mid-way from the center appear at approximately the correct distances from the camera and experience less significant distortions. Faces towards the edge experience very significant geometrical distortions. The exact nature of each of these types of perspective and geometrical distortion depend on the nature of the lens and optical system.

Clearly a conventional face detection or face tracking system employing rectangular classifiers or integral image techniques cannot be conveniently applied directly to such faces. Accordingly methods are desired to adapt and compensate for image distortions within such WFOV imaging systems so that face detection technologies can be successfully employed in devices like digital cameras and video phone systems.

The following is from http://www.panorama-numerique.com/squeeze/squeeze.htm, where it is referred to as "Correcting wider than 90° rectilinear images to print or to display architecture panoramas," by Georges Lagarde. The indicated point is to remove stretching near the sides of a wide angle shot. Mr. Lagarde indicates that one simply has to "just squeeze your panos!" However, in practice, there are greater complexities that than. This application provides several embodiments after this introduction for displaying panoramas without all the inherent distortion.

Mr. Lagarde points out that 180° panoramic images require large screen real-estate. Reduced to a more usual size, Mr. Lagarde presents the examples illustrated at FIGS. 1A-1G. While panoramic images are typically difficult to appraise, displaying them in a narrow window has generally been avoided, and instead a 1280×1024 screen or "larger" and a fast Internet connection may be typically recommended.

Mr. Lagarde points out that the exact same source images of FIGS. 1A-1G (showing the Préfecture building in Grenoble, France) were used in a previous tutorial: Rectilinear/cylindric/equirectangular selection made easy, and that different but acceptable panoramic images can result from stitching the same source images and then using different projection modes is implied here and there.

FIG. 1A illustrates Piazza Navona, Roma by Gaspar Van Wittel, 1652-1736 (Museo Thyssen-Bornemisza, Madrid).

Mr. Lagarde indicates that most photographers restrict themselves to subjects which can be photographed with a rectilinear lens (plane projection). A small number of them sometimes use a fisheye lens (spherical projection) or a rotating lens camera (cylindrical projection) or a computer (stitcher programs make use of various projection modes), but when the field of view (horizontal FOV and/or vertical FOV) is higher than 90 degrees (or about, this actually depends on the subject) they are disturbed by the "excessive wide-angle distortion" found in the resulting images.

Adapting the usual projection modes to the subject and/or using multiple local projections to avoid this distortion is a violation of the classical perspective rules, but escaping classical perspective rules is exactly what sketchers and painters always did to avoid unpleasant images. Mr. Lagarde points out that this was explained by Anton Maria Zanetti and Antonio Conti using the words of their times ("Il Professore m'entendara") when they described how the camera ottica was used by the seventeenth century Venetian masters. Because the field of view of the lenses available then was much lower than 90°, that a camera oscura was not able to display the very wide vedute they sketched and painted is evident: the solution was to record several images and to stitch them onto the canvas to get a single view (strangely enough, that the field of view is limited to about 90 degrees when one uses classical perspective—aka rectilinear projection on a vertical plane—is not handled in most perspective treatises.)

Equivalent "tricks" can be used for photographic images:

Use of several projection planes—their number and location depending of the subject—for a single resulting image. This is the method explained by L. Zelnik-Manor in Squaring the Circle in Panoramas (see references.)

Use of several projection modes—the selected modes depending of the subject—for a single resulting image. This is the method proposed by Buho (Eric S.) and used by Johnh (John Houghton) in Hybrid Rectilinear & Cylindrical projections (see references.)

Use of an "altered rectilinear" projection (thus no more rectilinear) where the modification is a varying horizontal compression, null in the center, high near the sides). This is the method proposed by Olivier_G (Olivier Gallen) in Panoramas: la perspective classique ne s'applique plus! (see references.)

Use of "squeezed rectilinear" projection (neither an actual rectilinear one) where the modification is a varying horizontal and vertical compression, null near the horizon (shown as a red line in the examples), null near a vertical line which goes through to the main vanishing point (shown as a blue line in the examples), increasing like tangent (angle) toward the sides (where angle correspond to the angular distance between the point and the line.)

If photographers like the results, no doubt they will use that.

EXAMPLE 1

Cylindrical—180°

In a first example, referring now to FIG. 1B, an image is shown that is a 180° panorama where cylindrical projection mode is used to show a long building viewed from a short distance. Most people dislike images like this one, where except for the horizon, every straight horizontal line is heavily curved.

EXAMPLE 2

Rectilinear—155°

The next image shown in FIG. 1C illustrates an attempt to use the rectilinear projection mode: every straight line in the buildings is rendered as a straight line. But, while rectilinear projection works well when field of view is lower than 90 degrees, it should never be used when field of view is larger than 120 degrees. In this image, though the field of view was restricted to 155 degree (original panorama corresponds to 180°), the stretching is too high in the left and right parts and the result utterly unacceptable.

EXAMPLE 3

Squeezed Rectilinear—155°

Referring to FIG. 1D, because digital images can be squeezed at will, rather than discarding this previous rectilinear image, one can correct the excessive stretching. The result is no more rectilinear (diagonal lines are somewhat distorted) but a much wider part of the buildings now have an acceptable look. The variable amount of squeezing I used is shown by the dotted line near the top side: the more close the dots are, the more compressed was the corresponding part of the rectilinear original.

EXAMPLE 4

Edges, from the 180° Cylindrical Version

Referring to FIG. 1E, the rendering of the main building is much better. Note that this view looks like it were taken from a more distant point of view than in the cylindrical image: this is not true, the same source images were used for both panoramas.

EXAMPLE 5

Center, from 155° Squeezed Rectilinear Version

Referring to FIG. 1F, the left most and right most parts of the squeezed image are improved, but they are still not very pleasant. Here is a possible solution, where I used the edge parts of the cylindrical version in a second layer:

EXAMPLE 6

Squeezed Rectilinear (Center)+Cylindrical (Left and Right Edges)—180°

And finally, referring to FIG. 1G: This view can be compared with the example of FIG. 1B on the top of this page: each one shows exactly the same buildings and cars, and each comes from exactly the same source images.

The pictured buildings in FIGS. 1B-1G are located on the sides of a large square but, because there are many large trees on this square, standing back enough for a large field of view is not possible. The image shown in FIG. 1B illustrates photos that were actually taken at a rather short distance from the main building, while FIG. 1G suggests the viewer being much more distant from this building.

BRIEF DESCRIPTION OF THE DRAWINGS

FIGS. 1A-1G illustrate various conventional attempts to avoid distortion in images with greater than 90° field of view.

FIG. 2 schematically illustrates a wide field of view (WFOV) system that in one embodiment incorporates a face tracker.

FIG. 3($b$) illustrates a wide horizontal scene not mapped onto a full extent of an image sensor, and instead a significant portion of the sensor is not used.

FIG. 4 illustrates the first four Haar classifiers used in face detection.

FIGS. 4($a$)-4($c$) illustrate magnification of a person speaking among a group of persons within a WDOF image.

FIGS. 5($a$)-5($c$) illustrate varying the magnification of a person speaking among a group of persons within a WDOF image, wherein the degree of magnification may vary depending on the strength or loudness of the speaker's voice.

DETAILED DESCRIPTIONS OF THE EMBODIMENTS

Figure 1D:
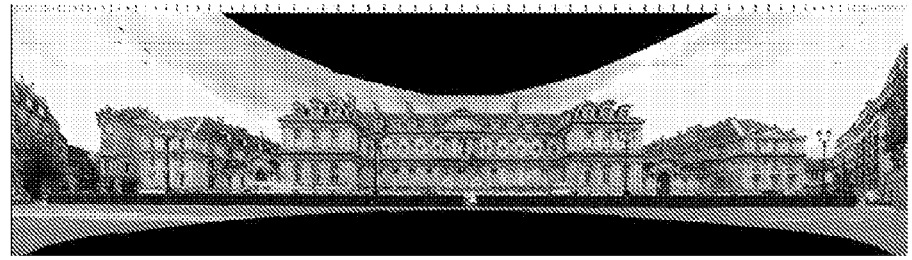
Figure 1E:

An image acquisition device having a wide field of view is provided. The device includes at least one lens and image sensor configured to capture an original wide field of view (WFoV) image with a field of view of more than 90°. The device also includes a control module and an object detection engine that includes one or more cascades of regular object classifiers. A WFoV correction engine of the device is configured to correct distortion within the original image. The WFoV correction engine processes raw image data of the original WFoV image. A rectilinear projection of center pixels of the original WFoV image is applied. A cylindrical projection of outer pixels of the original WFoV image is alos applied. Modified center and outer pixels are combined to generate a distortion-corrected WFoV image. One or more objects located within the center or outer pixels, or both, of the distortion-corrected WFoV image are detectable by the object detection engine upon application of the one or more cascades of regular object classifiers.

The applying of the rectilinear projection to center pixels may also include applying a regular rectilinear projection to an inner portion of the center pixels and a squeezed rectilinear projection to an outer portion of the center pixels. The applying of the squeezed rectilinear projection to the outer portion of the center pixels may also include applying an increasingly squeezed rectilinear projection in a direction from a first boundary with the inner portion of the center pixels to a second boundary with the outer pixels.

Another image acquisition device having a wide field of view is provided. The device includes at least one lens and image sensor configured to capture an original wide field of view (WFoV) image with a field of view of more than 90°, a control module, and an object detection engine that includes one or more cascades of modified object classifiers. The modified object classifiers include a first subset of rectilinear classifiers to be applied to objects appearing in center pixels of the WFoV image, and a second subset of cylindrical classifiers to be applied to objects appearing in outer pixels of the WFoV image. One or more objects located within the center or outer pixels, or both, of the original WFoV image are detectable by the object detection engine upon application of the one or more cascades of modified object classifiers, including the first subset of rectilinear classifiers and the second subset of cylindrical classifiers, respectively.

The first subset of rectilinear classifiers may include a subset of regular rectilinear classifiers with which objects appearing in an inner portion of the center pixels are detectable, and a subset of squeezed rectilinear classifiers with which objects appearing in an outer portion of the center pixels are detectable. The subset of squeezed rectilinear classifiers may include subsets of increasingly squeezed rectilinear classifiers with which objects appearing in the outer portion of the center pixels are increasingly detectable in a direction from a first boundary with the inner portion of the center pixels to a second boundary with the outer pixels.

The device may also include a WFoV correction engine configured to correct distortion within the original image. The WFoV correction engine may process raw image data of the original WFoV image. A rectilinear mapping of center pixels of the original WFoV image may be applied. A cylindrical mapping of outer pixels of the original WFoV image may also be applied. Modified center and outer pixels may be combined to generate a distortion-corrected WFoV image.

A method is provided for acquiring wide field of view images with an image acquisition device having at least one lens and image sensor configured to capture an original wide field of view (WFoV) image with a field of view of more than 90°. The method includes acquiring the original WFoV image. Distortion is corrected within the original WFoV image by processing raw image data of the original WFoV image. A rectilinear projection is applied to center pixels of the original WFoV image and a cylindrical projection is applied to outer pixels of the original WFoV image. Modified center and outer pixels are combined to generate a distortion-corrected WFoV image. One or more cascades of regular object classifiers are applied to detect one or more objects located within the center or outer pixels, or both, of the distortion-corrected WFoV image upon application of the one or more cascades of regular object classifiers.

The applying a rectilinear projection to center pixels may include applying a regular rectilinear projection to an inner portion of the center pixels and a squeezed rectilinear projection to an outer portion of the center pixels. The applying of a squeezed rectilinear projection to the outer portion of the center pixels may include applying an increasingly squeezed rectilinear projection in a direction from a first boundary with the inner portion of the center pixels to a second boundary with the outer pixels.

A further method is provided for acquiring wide field of view images with an image acquisition device having at least one lens and image sensor configured to capture an original wide field of view (WFoV) image with a field of view of more than 90°. The method includes acquiring the original WFoV image. One or more cascades of modified object classifiers are applied. A first subset of rectilinear classifiers is applied to objects appearing in center pixels of the WFoV image, and a second subset of cylindrical classifiers is applied to objects appearing in outer pixels of the WFoV image. One or more objects located within the center or outer pixels, or both, of the original WFoV image is/are detected by the applying of the modified object classifiers, including the applying of the first subset of rectilinear classifiers and the applying of the second subset of cylindrical classifiers, respectively.

The applying of the first subset of rectilinear classifiers may include applying a subset of regular rectilinear classifiers with which objects appearing in an inner portion of the center pixels are detectable, and/or applying a subset of squeezed rectilinear classifiers with which objects appearing in an outer portion of the center pixels are detectable. The applying of the subset of squeezed rectilinear classifiers may include applying subsets of increasingly squeezed rectilinear classifiers with which objects appearing in the outer portion of the center pixels are increasingly detectable in a direction from a first boundary with the inner portion of the center pixels to a second boundary with the outer pixels.

The method may include correcting distortion within the original image by processing raw image data of the original WFoV image including applying a rectilinear mapping of center pixels of the original WFoV image and a cylindrical mapping of outer pixels of the original WFoV image, and combining modified center and outer pixels to generate a distortion-corrected WFoV image.

One or more processor-readable media having embedded therein code for programming a processor to perform any of the methods described herein.

Another image acquisition device having a wide field of view is provided. The device includes at least one non-linear lens and image sensor configured to capture an original wide field of view (WFoV) image with a field of view of more than 90°. The non-linear lens is configured to project a center region of a scene onto the middle portion of the image sensor such as to directly provide a rectilinear mapping of the center region. The device also includes an object detection engine including one or more cascades of regular object classifiers. A WFoV correction engine of the device is configured to correct distortion within the original WFoV image. The WFoV correction engine processes raw image data of the original WFoV image. A cylindrical projection of outer pixels of the original WFoV image is applied. Center pixels and modified outer pixels are combined to generate a distortion-corrected WFoV image. One or more objects located within the center or outer pixels, or both, of the distortion-corrected WFoV image are detectable by the object detection engine upon application of the one or more cascades of regular object classifiers.

Another image acquisition device having a wide field of view is provided. The device includes at least one non-linear lens and image sensor configured to capture an original wide field of view (WFoV) image with a field of view of more than 90°. The non-linear lens is configured to project a center region of a scene onto the middle portion of the image sensor such as to directly provide a rectilinear mapping of the center region. An object detection engine includes one or more cascades of modified object classifiers including a subset of cylindrical classifiers to be applied to objects appearing in outer pixels of the WFoV image. One or more objects located within the center or outer pixels, or both, of the original WFoV image are detectable by the object detection engine upon application of the one or more cascades of modified object classifiers, including a subset of regular classifiers and the subset of cylindrical classifiers, respectively.

The device may include a WFoV correction engine configured to correct distortion within the original image. The WFoV correction engine processes raw image data of the original WFoV image. A cylindrical mapping of outer pixels of the original WFoV image is performed. Center pixels and modified outer pixels are combined to generate a distortion-corrected WFoV image.

Another method is provided for acquiring wide field of view images with an image acquisition device having at least one lens and image sensor configured to capture an original wide field of view (WFoV) image with a field of view of more than 90°. The method includes acquiring the original WFoV image, including utilizing at least one non-linear lens to project a center region of a scene onto a middle portion of the image sensor such as to directly provide a rectilinear mapping of the center region. Distortion is corrected within the original WFoV image by processing raw image data of the original WFoV image. A cylindrical projection of outer pixels of the original WFoV image is applied. Center pixels and modified outer pixels are combined to generate a distortion-corrected WFoV image. One or more objects are detected by applying one or more cascades of regular object classifiers to one or more objects located within the center or outer pixels, or both, of the distortion-corrected WFoV image.

A further method is provided for acquiring wide field of view images with an image acquisition device having at least one lens and image sensor configured to capture an original wide field of view (WFoV) image with a field of view of more than 90°. The method includes acquiring the original WFoV image, including utilizing at least one non-linear lens to project a center region of a scene onto a middle portion of the image sensor such as to directly provide a rectilinear mapping of the center region. One or more modified object classifiers are applied. A subset of cylindrical classifiers is applied to objects appearing in outer pixels of the WFoV image, and a subset of regular classifiers is applied to objects appearing in center pixels of the WFoV image. One or more objects located within center or outer pixels, or both, of the original WFoV image are detected by the applying of the one or more cascades of modified object classifiers, including the applying of the subset of regular classifiers and the applying of the subset of cylindrical classifiers, respectively.

The method may include correcting distortion within the original WFoV image by processing raw image data of the original WFoV image, including applying a cylindrical mapping of outer pixels of the original WFoV image, and combining center pixels and modified outer pixels to generate a distortion-corrected WFoV image.

One or more processor-readable media having embedded therein code is/are provided for programming a processor to perform any of the methods described herein of processing wide field of view images acquired with an image acquisition device having an image sensor and at least one non-linear lens to project a center region of a scene onto a middle portion of the image sensor such as to directly provide a rectilinear mapping of the center region to acquire an original wide field of view (WFoV) image with a field of view of more than 90°.

Another image acquisition device having a wide field of view is provided. The device includes a lens assembly and image sensor configured to capture an original wide field of view (WFoV) image with a field of view of more than 90°. The lens assembly includes a compressed rectilinear lens to capture a center region of a scene onto a middle portion of the image sensor such as to directly provide a rectilinear mapping of the center region. The device also includes a cylindrical lens on one or both sides of the compressed rectilinear lens to capture outer regions of the scene onto outer portions of the image sensor such as to directly provide a cylindrical mapping of the outer regions. An object detection engine of the device includes one or more cascades of regular object classifiers. One or more objects located within the center or outer pixels, or both, of the original WFoV image is/are detectable by the object detection engine upon application of the one or more cascades of regular object classifiers.

Another image acquisition device having a wide field of view is provided. The device includes a lens assembly and image sensor configured to capture an original wide field of view (WFoV) image with a field of view of more than 90°. The lens assembly includes a lens having a compressed rectilinear center portion to capture a center region of a scene onto a middle portion of the image sensor such as to directly provide a rectilinear mapping of the center region. The lens also includes cylindrical outer portions on either side of the compressed rectilinear portion to capture outer regions of the scene onto outer portions of the image sensor such as to directly provide a cylindrical mapping of the outer regions. An object detection engine of the device includes one or more cascades of regular object classifiers. One or more objects located within the center or outer pixels, or both, of the original WFoV image is/are detectable by the object detection engine upon application of the one or more cascades of regular object classifiers.

Another image acquisition device having a wide field of view is provided. The device includes multiple cameras configured to capture an original wide field of view (WFoV) image with a field of view of more than 90°. The original wide field of view image includes a combination of multiple images captured each with one of the multiple cameras. The multiple cameras include a first camera having a first image sensor and a compressed rectilinear lens to capture a center region of a scene onto the first sensor such as to directly provide a rectilinear mapping of the center region, and a second camera having a second image sensor and a first cylindrical lens on a first side of the compressed rectilinear lens to capture a first outer region of the scene onto the second image sensor such as to directly provide a cylindrical mapping of the first outer region, and a third camera having a third image sensor and a second cylindrical lens on a second side of the compressed rectilinear lens to capture a second outer region of the scene onto the third image sensor such as to directly provide a cylindrical mapping of the second outer region. An object detection engine of the device includes one or more cascades of regular object classifiers. One or more objects located within the original wide field of view image appearing on the multiple cameras of the original WFoV image is/are detectable by the object detection engine upon application of the one or more cascades of regular object classifiers.

Another image acquisition device having a wide field of view is provided. The device includes multiple cameras configured to capture an original wide field of view (WFoV) image with a field of view of more than 90°. The original wide field of view image includes a combination of multiple images captured each with one of the multiple cameras. The multiple cameras each utilize a same lens and include a first camera having a first image sensor utilizing a compressed rectilinear portion of the lens to capture a center region of a scene onto the first sensor such as to directly provide a rectilinear mapping of the center region, and a second camera having a second image sensor utilizing a first cylindrical portion of the lens on a first side of the compressed rectilinear portion to capture a first outer region of the scene onto the second image sensor such as to directly provide a cylindrical mapping of the first outer region, and a third camera having a third image sensor utilizing a second cylindrical portion of the lens on a second side of the compressed rectilinear portion to capture a second outer region of the scene onto the third image sensor such as to directly provide a cylindrical mapping of the second outer region.

An object detection engine of the device includes one or more cascades of regular object classifiers. One or more objects located within the original wide field of view image appearing on the multiple cameras of the original WFoV image is/are detectable by the object detection engine upon application of the one or more cascades of regular object classifiers.

Any of the devices described herein may include a full frame buffer coupled with the image sensor for acquiring raw image data, a mixer, and a zoom and pan engine, and/or an object tracking engine, just as any of the methods described herein may include tracking one or more detected objects over multiple sequential frames. Any of the object classifiers described herein may include face classifiers or classifiers of other specific objects. Any of the regular object classifiers described herein may include rectangular object classifiers.

Exemplary face region images distorted in a manner like the building frontages of FIGS. 1B-1G, i.e. distorted by a WFOV, might have rectilinear distortion similar to FIG. 1C at the edges, and as in FIG. 1B cylindrical projection.

The system shown in FIG. 2 includes a wide field of view (WFOV) lens of for example 120 degrees; a sensor, for example of 3 megapixels or more; a full frame buffer (e.g., from Bayer); a WFOV correction module; a face detector and face tracker; a zoom and pan engine; a mixer and a control module. The WFOV system illustrated at FIG. 1 incorporates lens assembly and corresponding image sensor which is typically more elongated than a conventional image sensor. The system further incorporates a face tracking module which employs one or more cascades of rectangular face classifiers.

As the system is configured to image a horizontal field of >90-100 degrees or more, it is desired to process the scene captured by the system to present an apparently "normal" perspective on the scene. There are several approaches to this as exemplified by the example drawn from the architectural perspective of a long building described in Appendix A. In the context of our WFOV camera this disclosure is primarily directed at considering how facial regions will be distorted by the WFOV perspective of this camera. One can consider such facial regions to suffer similar distortions to the frontage of the building illustrated in this attached Appendix. Thus the problem to obtain geometrically consistent face regions across the entire horizontal range of the WFOV camera is substantially similar to the architectural problem described therein.

Thus, in order to obtain reasonable face regions, it is useful to alter/map the raw image obtained from the original WFOV horizontal scene so that faces appear undistorted. Or in alternative embodiments face classifiers may be altered according to the location of the face regions within an unprocessed (raw) image of the scene.

In a first preferred embodiment the center region of the image representing up to 100' of the horizontal field of view (FOV) is mapped using a squeezed rectilinear projection. In a first embodiment this may be obtained using a suitable non-linear lens design to directly project the center region of the scene onto the middle ⅔ of the image sensor. The remaining approximately ⅓ portion of the image sensor (i.e. ⅙ at each end of the sensor) has the horizontal scene projected using a cylindrical mapping. Again in a first preferred embodiment the edges of the wide-angle lens are designed to optically effect said projection directly onto the imaging sensor.

Figure 3A:
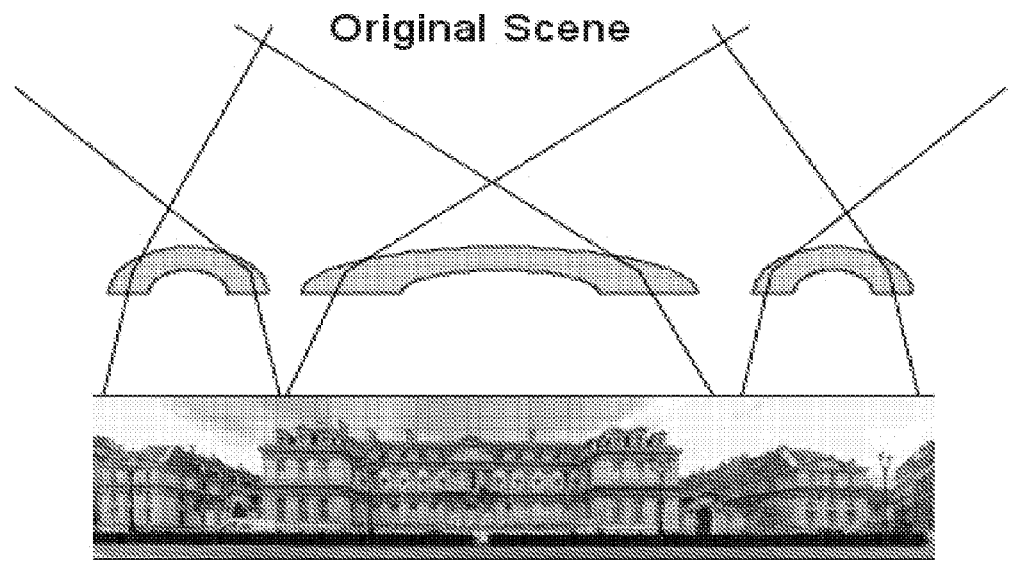
FIG. 3($a$) illustrates a wide horizontal scene mapped onto a full extent of an image sensor.

Thus, in a first embodiment, the entire horizontal scene is mapped onto the full extent of the image sensor, as illustrated at FIG. 3(a).

Figure 3B:
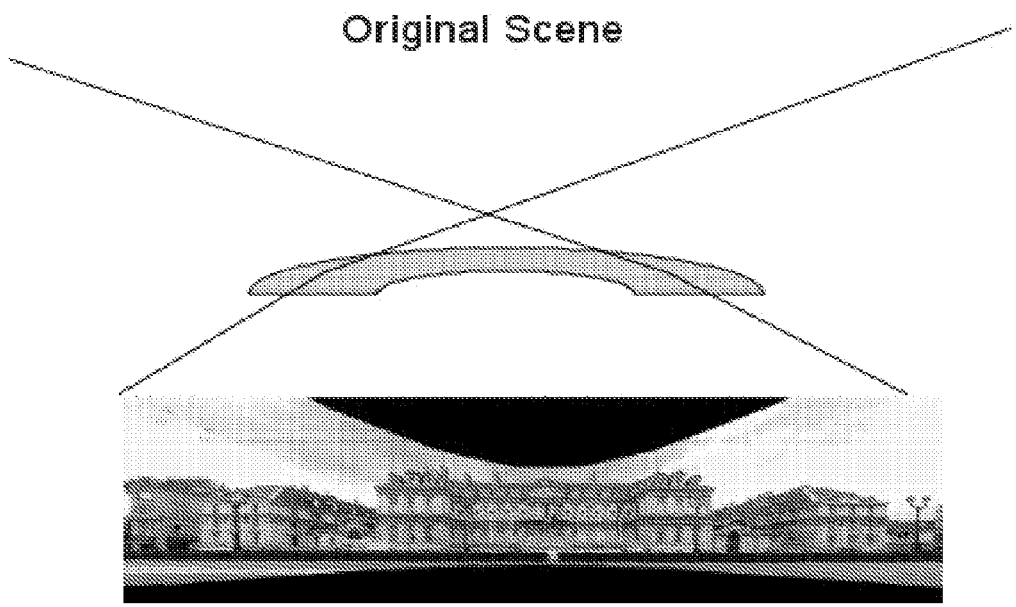

Naturally the form and structure of such a complex hybrid optical lens may not be conducive to mass production thus in an alternative embodiment a more conventional rectilinear wide-angle lens is used and the squeezing of the middle ⅔ of the image is achieved by post-processing the sensor data. Similarly the cylindrical projections of the outer regions of the WFOV scene are performed by post processing. In this second embodiment the initial projection of the scene onto the sensor does not cover the full extent of the sensor and thus a significant portion of the sensor area does not contain useful data. The overall resolution of this second embodiment is reduced and a larger sensor would be used to achieve similar accuracy to the first embodiment, as illustrated at FIG. 3(b).

In a third embodiment some of the scene mappings are achieved optically, but some additional image post-processing is used to refine the initial projections of the image scene onto the sensor. In this embodiment the lens design can be optimized for manufacturing considerations, a larger portion of the sensor area can be used to capture useful scene data and the software post-processing overhead is similar to the pure software embodiment.

In a fourth embodiment multiple cameras are configured to cover overlapping portions of the desired field of view and the acquired images are combined into a single WFOV image in memory. Preferably, this plurality of cameras are configured to have the same optical center, thus mitigating perspective related problems for foreground objects. In such an embodiment techniques employed in panorama imaging may be used advantageously to join images at their boundaries, or to determine the optimal join line where a significant region of image overlap is available. The following cases assigned to the same assignee relate to panorama imaging and are incorporated by reference: Ser. Nos. 12/636,608, 12/636,618, 12/636,629, 12/636,639, and 12/636,647, as are US published apps nos. U.S. patent application US20060182437, US20090022422, US20090021576 and US20060268130.

In one preferred embodiment of the multi-camera WFOV device three, or more standard cameras with a 60 degree FOV are combined to provide an overall horizontal WFOV of 120-150 degrees with an overlap of 15-30 degrees between cameras. The field of view for such a cameras can be extended horizontally by adding more cameras; it may be extended vertically by adding an identical array of 3 or more horizontally aligned cameras facing in a higher (or lower) vertical direction and with a similar vertical overlap of 15-30 degrees offering a vertical FOV of 90-105 degrees for two such WFOV arrays. The vertical FOV may be increased by adding further horizontally aligned cameras arrays. Such configurations have the advantage that all individual cameras can be conventional wafer-level cameras (WLC) which can be mass-produced.

In an alternative multi-cameras embodiment a central WFOV cameras has its range extended by two side-cameras. The WFOV cameras can employ an optical lens optimized to provide a 120 degree compressed rectilinear mapping of the central scene. The side cameras can be optimized to provide a cylindrical mapping of the peripheral regions of the scene, thus providing a similar result to that obtained in FIG. 3(a), but using three independent cameras with independent optical systems rather than a single sensor/ISP as shown in FIG. 3(b). Again techniques employed in panorama imaging to join overlapping images can be advantageously used (see the Panorama cases referred to above herein).

After image acquisition and, depending on the embodiment, additional post-processing of the image, we arrive at a mapping of the image scene with three main regions. Over the middle third of the image there is a normal rectilinear mapping and the image is undistorted compared to a standard FOV image; over the next ⅓ of the image (i.e. ⅙ of image on either side) the rectilinear projection becomes increasingly squeezed as illustrated in FIGS. 1A-1G; finally, over the outer approximately ⅓ of the image a cylindrical projection, rather than rectilinear is applied.

FIG. 3(a) illustrates one embodiment where this can be achieved using a compressed rectilinear lens in the middle, surrounded by two cylindrical lenses on either side. In a practical embodiment all three lenses could be combined into a single lens structure designed to minimize distortions where the rectilinear projection of the original scene overlaps with the cylindrical projection.

A standard face-tracker can now be applied to the WFOV image as all face regions should be rendered in a relatively undistorted geometry.

In alternative embodiments the entire scene need not be re-mapped, but instead only the luminance components are re-mapped and used to generate a geometrically undistorted integral image. Face classifiers are then applied to this integral image in order to detect faces. Once faces are detected those faces and their surrounding peripheral regions can be re-mapped on each frame, whereas it may be sufficient to re-map the entire scene background, which is assumed to be static, only occasionally, say every 60-120 image frames. In this way image processing and enhancement can be focussed on the people in the image scene.

In alternative embodiments it may not be desirable to completely re-map the entire WFOV scene due to the computational burden involved. In such embodiment, referring to U.S. Pat. Nos. 7,460,695, 7,403,643, 7,565,030, and 7,315,631 and US published app no. 2009-0263022, which are incorporated by reference along with US20090179998, US20090080713, US 2009-0303342 and U.S. Ser. No. 12/572,930, filed Oct. 2, 2009 by the same assignee. These references describe predicting face regions (determined from the previous several video frames). The images may be transformed using either cylindrical or squeezed rectilinear projection prior to applying a face tracker to the region. In such an embodiment, it may be involved from time to time to re-map a WFOV in order to make an initial determination of new faces within the WFOV image scene. However, after such initial determination only the region immediately surrounding each detected face need be re-mapped.

In certain embodiments, the remapping of the image scene, or portions thereof, involves the removal of purple fringes (due to blue shift) or the correction of chromatic aberrations. The following case is assigned to the same assignee is incorporated by reference and relates to purple fringing and chromatic aberration correction: US20090189997.

In other embodiments a single mapping of the input image scene is used. If, for example, only a simple rectilinear mapping were applied across the entire image scene the edges of the image would be distorted as in FIG. 1C and only across the middle 40% or so of the image can a conventional face tracker be used. Accordingly the rectangular classifiers of the face tracker are modified to take account of the scene mappings across the other 60% of image scene regions: Over the middle portion of the image they can be applied unaltered; over the second 30% they are selectively expanded or compressed in the horizontal direction to account for the degree of squeezing of the scene during the rectilinear mapping process. Finally, in the outer ⅓ the face classifiers are adapted to account for the cylindrical mapping used in this region of the image scene.

In order to transform standard rectangular classifiers of a particular size, say 32×32 pixels, it may be advantageous in some embodiments to increase the size of face classifiers to, for example, 64×64. This larger size of classifier would enable greater granularity, and thus improved accuracy in transforming normal classifiers to distorted ones. This comes at the expense of additional computational burden for the face tracker. However we note that face tracking technology is quite broadly adopted across the industry and is known as a robust and well optimized technology. Thus the trade off of increasing classifiers from 32×32 to 64×64 for such faces should not cause a significant delay on most camera or smart-phone platforms. The advantage is that pre-existing classifier cascades can be re-used, rather than having to train new, distorted ones.

Having greater granularity for the classifiers is advantageous particularly when starting to rescale features inside the classifier individually, based on the distance to the optical center. In another embodiment, one can scale the whole 22×22 (this is a very good size for face classifiers) classifier with fixed dx,dy (computed as distance from the optical center). Having larger classifiers does not put excessive strain on the processing. Advantageously, it is opposite to that, because there are fewer scales to cover. In this case, the distance to subject is reduced.

Figure 1F:
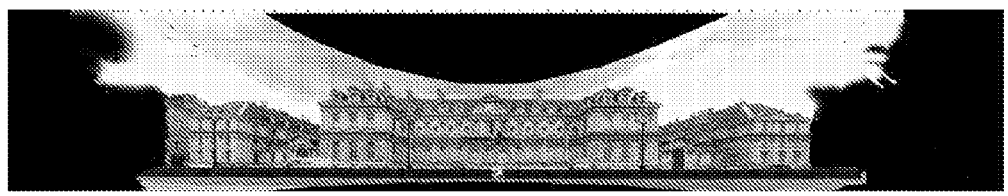
Figure 1G:
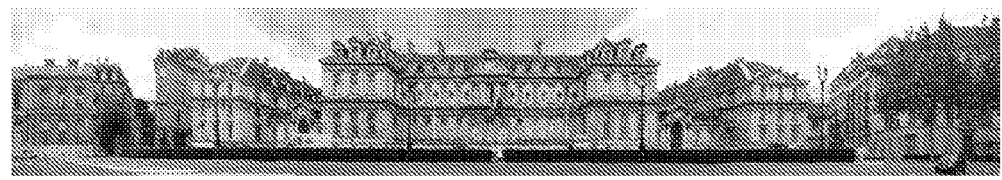

In an alternative embodiment an initial, shortened chain of modified classifiers is applied to the raw image (i.e. without any rectilinear or cylindrical re-mapping). This chain is composed of some of the initial face classifiers from a normal face detection chain. These initial classifiers are also, typically, the most aggressive to eliminate non-faces from consideration. These also tend to be simpler in form and the first four Haar classifiers from the Viola-Jones cascade are illustrated in FIG. 4 (these may be implemented through a 22×22 pixel window in another embodiment).

Where a compressed rectilinear scaling would have been employed (as illustrated in FIG. 1F, it is relatively straight-forward to invert this scaling and expand (or contract) these classifiers in the horizontal direction to compensate for the distortion of faces in the raw image scene. (In some embodiments where this distortion is cylindrical towards the edges of the scene then classifiers may need to be scaled both in horizontal and vertical directions). Further, it is possible from a knowledge of the location at which each classifier is to be applied and, optionally, the size of the detection window, to perform the scaling of these classifiers dynamically. Thus only the original classifiers have to be stored together with data on the required rectilinear compression factor in the horizontal direction. The latter can easily be achieved using a look-up table (LUT) which is specific to the lens used.

This short classifier chain is employed to obtain a set of potential face regions which may then be re-mapped (using, for example, compressed rectilinear compression and/or cylindrical mapping) to enable the remainder of a complete face detection classifier chain to be applied to each potential face region. This embodiment relies on the fact that 99.99% of non-face regions are eliminated by applying the first few face classifiers; thus a small number of potential face regions would be re-mapped rather than the entire image scene before applying a full face detection process.

In another embodiment, distortion may be compensated by a method that involves applying geometrical adjustments (function of distance to optical center) when an integral image is computed (in the cases where the template matching is done using II) or compensate for the distortion when computing the sub-sampled image used for face detection and face tracking (in the cases where template matching is done directly on Y data).

Note that face classifiers can be divided into symmetric and non-symmetric classifiers. In certain embodiments it may be advantageous to use split classifier chains. For example right and left-hand face detector cascades may report detection of a half-face region—this may indicate that a full face is present but the second half is more or less distorted than would be expected, perhaps because it is closer to or farther from the lens than is normal. In such cases a more relaxed half, or full-face detector may be employed to confirm if a full face is actually present or a lower acceptance threshold may be set for the current detector. The following related apps assigned to the same assignee are incorporated by reference: US2007/0147820, US2010/0053368, US2008/0205712, US2009/0185753, US2008/0219517 and 2010/0054592, and U.S. Ser. No. 61/182,625, filed May 29, 2009 and U.S. Ser. No. 61/221,455, filed Jun. 29, 2009.

In certain embodiments, when a face is tracked across the scene it may be desired to draw particular attention to that face and to emphasize it against the main scene. In one exemplary embodiment, suitable for applications in videotelephony, there may be one or more faces in the main scene but one (or more) of these is speaking. It is possible, using a stereo microphone to localize the speaking face.

This face regions, and the other foreground regions (e.g. neck, shoulders & torso) are further processed to magnify them (e.g., in one embodiment by a factor of ×1.8 times) against the background; in a simple embodiment this magnified face is simply composited onto the background image in the same location as the unmagnified original In a more sophisticated embodiment the other faces and the main background of the image are de-magnified and/or squeezed in order to keep the overall image size self-consistent. This may lead to some image distortion, particularly surrounding the "magnified" face, but this helps to emphasize the person speaking as illustrated in FIGS. 4(a)-4(c). In this case the degree of magnification is generally <×1.5 to avoid excessive distortion across the remainder of the image.

In another embodiment, one can do a background+face mix or combination using an alpha map without worrying about distortions. Then, the face that speaks can be placed at the middle of the frame. In an another variation on this embodiment, the degree of magnification can be varied according to the strength or loudness of a speaker's voice, as illustrated at FIGS. 5(a)-5(c).

In other embodiments based on the same scene re-mapping techniques, the rendering of the face region and surrounding portions of the image can be adjusted to emphasize one or more persons appearing in the final, re-mapped image of the captured scene. In one embodiment within a videophone system, a stereo microphone system triangulates the location of the person speaking and a portion of the scene is zoomed by a factor greater than one. The remaining portions of the image are zoomed by a factor less than one, so that the overall image is of approximately the same dimension. Thus persons appearing in the image appear larger when they are talking and it is easier for viewers to focus on the current speaker from a group.

The present invention is not limited to the embodiments described above herein, which may be amended or modified without departing from the scope of the present invention.

In methods that may be performed according to preferred embodiments herein and that may have been described above, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components. Moreover, as extended depth of field (EDOF) technology may be combined with embodiments described herein into advantageous alternative embodiments, the following are incorporated by reference: U.S. published patent applications numbers 20060256226, 20060519527, 20070239417, 20070236573, 20070236574, 20090128666, 20080095466, 20080316317, 20090147111, 20020145671, 20080075515, 20080021989, 20050107741, 20080028183, 20070045991, 20080008041, 20080009562, 20080038325, 20080045728, 20090531723, 20090190238, 20090141163, and 20080002185.

What is claimed is:

1. An image acquisition device having a wide field of view, comprising:
   a lens assembly and image sensor configured to capture an original wide field of view (WFoV) image with a field of view of more than 90°, wherein the lens assembly comprises a compressed rectilinear lens to capture a center region of a scene onto a middle portion of the image sensor such as to directly provide a rectilinear mapping of the center region and a cylindrical lens on one or both sides of the compressed rectilinear lens to capture outer regions of the scene onto outer portions of the image sensor such as to directly provide a cylindrical mapping of the outer regions;
   a control module;
   an object detection engine comprising one or more cascades of regular object classifiers;
   wherein one or more objects located within the center or outer pixels, or both, of the original WFoV image are detectable by the object detection engine upon application of the one or more cascades of regular object classifiers.

2. The device of claim 1, further comprising:
   a full frame buffer coupled with the image sensor for acquiring raw image data;
   a mixer; and
   a zoom and pan engine.

3. The device of claim 1, further comprising an object tracking engine.

4. The device of claim 1, wherein the object classifiers comprise face classifiers.

5. The device of claim 1, wherein the regular object classifiers comprise rectangular object classifiers.

6. An image acquisition device having a wide field of view, comprising:
   a lens assembly and image sensor configured to capture an original wide field of view (WFoV) image with a field of view of more than 90°, wherein the lens assembly comprises a lens having a compressed rectilinear center portion to capture a center region of a scene onto a middle portion of the image sensor such as to directly provide a rectilinear mapping of the center region, and the lens also comprises cylindrical outer portions on either side of the compressed rectilinear portion to capture outer regions of the scene onto outer portions of the image sensor such as to directly provide a cylindrical mapping of the outer regions;
   a control module;
   a object detection engine comprising one or more cascades of regular object classifiers;
   wherein one or more objects located within the center or outer pixels, or both, of the original WFoV image are detectable by the object detection engine upon application of the one or more cascades of regular object classifiers.

7. The device of claim 6, further comprising:
   a full frame buffer coupled with the image sensor for acquiring raw image data;
   a mixer; and
   a zoom and pan engine.

8. The device of claim 6, further comprising an object tracking engine.

9. The device of claim 6, wherein the object classifiers comprise face classifiers.

10. The device of claim 6, wherein the regular object classifiers comprise rectangular object classifiers.

* * * * *